HARMONIC DISTORTION ELIMINATOR FOR A.C. GENERATOR

Filed Nov. 20, 1959 2 Sheets-Sheet 1

INVENTOR.
JULES H. POIRIER
BY Knox & Knox

July 12, 1960 J. H. POIRIER 2,945,136

HARMONIC DISTORTION ELIMINATOR FOR A.C. GENERATOR

Filed Nov. 20, 1959 2 Sheets-Sheet 2

INVENTOR.
JULES H. POIRIER
BY Knox & Knox 2,945,136
Patented July 12, 1960

2,945,136

HARMONIC DISTORTION ELIMINATOR FOR A.C. GENERATOR

Jules H. Poirier, Lemon Grove, Calif., assignor to Ryan Aeronautical Co., San Diego, Calif.

Filed Nov. 20, 1959, Ser. No. 854,305

6 Claims. (Cl. 307—105)

The present invention relates generally to A.C. voltage distortion filters and more particularly to a harmonic distortion eliminator for A.C. generators.

The primary object of this invention is to provide a harmonic distortion eliminator which filters out undesirable harmonics and transients from the sine wave output voltage of a variable frequency A.C. generator, regardless of load conditions, yet maintains the output in close phase synchronization with the generator.

Another object of this invention is to provide a harmonic distortion eliminator in which the rejection filter is automatically tuned by a phase comparator circuit, which avoids mistuning due to changes in core hysteresis, amplifier gain and environmental effects.

Another object of this invention is to provide a harmonic distortion eliminator having very low power requirements, resulting in a reduction in weight, complexity and cost.

A further object of this invention is to provide a harmonic distortion eliminator utilizing a full-wave, D.C. output, differential voltage phase comparator which can be used with a simple, grounded differential D.C. amplifier.

Finally, it is an object to provide a harmonic distortion eliminator of the aforementioned character which is simple and convenient to build and use and which will give generally efficient and durable service over a wide range of operating conditions.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 1:
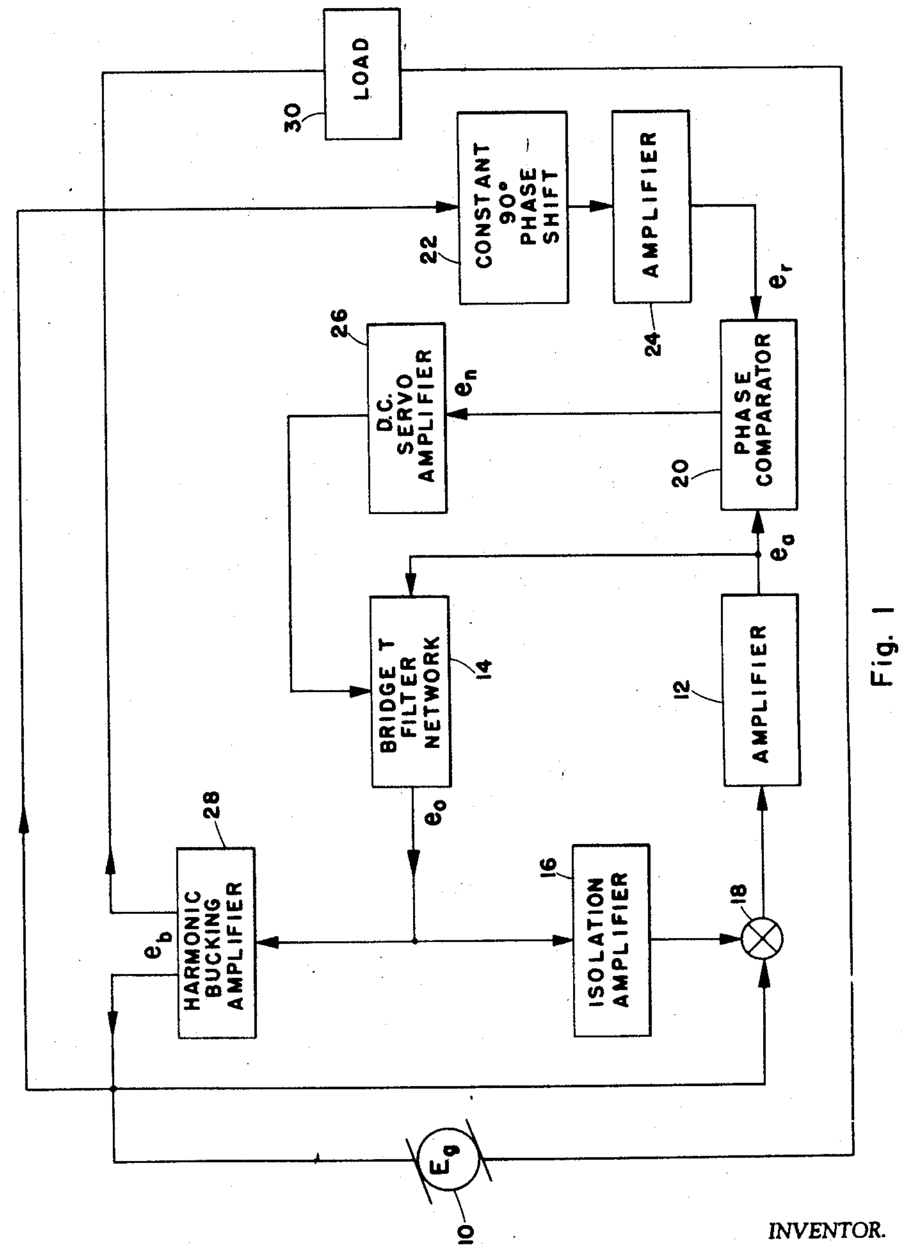
Figure 1 is a block diagram of the distortion eliminator.

Referring now to Figure 1 in particular, a conventional A.-C. generator 10 has its output voltage containing the undesirable harmonics applied to an amplifier 12, said amplifier producing an output voltage $e_a$ which is fed back through a bridge T filter network 14 and isolation amplifier 16 to the input of amplifier 12 at the mixing network 18. This feedback loop is arranged so that unity negative feedback exists for all frequencies except the fundamental and provides a fundamental frequency, band pass amplifier circuit between the output voltage $e_a$ of amplifier 12 and the output voltage $E_g$ of generator 10. The output voltage $e_a$ of amplifier 12 is also applied to one side of a phase comparator 20.

The generator voltage $E_g$ is passed through a 90 degree phase shifter 22 and amplifier 24 to provide a reference voltage $e_r$ lagging 90 degrees from the generator voltage, and this reference voltage is applied to the other side of the phase comparator 20, which compares the two voltages $e_a$ and $e_r$. If the voltages are exactly 90 degrees out of phase, the phase comparator output is zero. But, if the amplifier output voltage $e_a$ shifts phase, either leading or lagging, the phase comparator 20 produces a plus or minus D.C. difference voltage $e_n$, which is fed to a differential D.C. servo amplifier 26. The differential output current of servo amplifier 26 is used to change the flux biased inductance of the bridge T filter network 14 and tunes the filter to reject the fundamental frequency of the generator voltage $E_g$ through the feedback loop. The harmonic output voltages $e_o$ of filter network 14 are delivered to a low distortion, harmonic bucking amplifier 28, which provides output bucking voltages $e_b$ 180 degrees out of phase and of substantially equal amplitude. These bucking voltages $e_b$ are applied between the output of generator 10 at its connection to the amplifier 12 and the load 30, thus the voltage across the load contains a minimum of harmonics.

Figure 2:
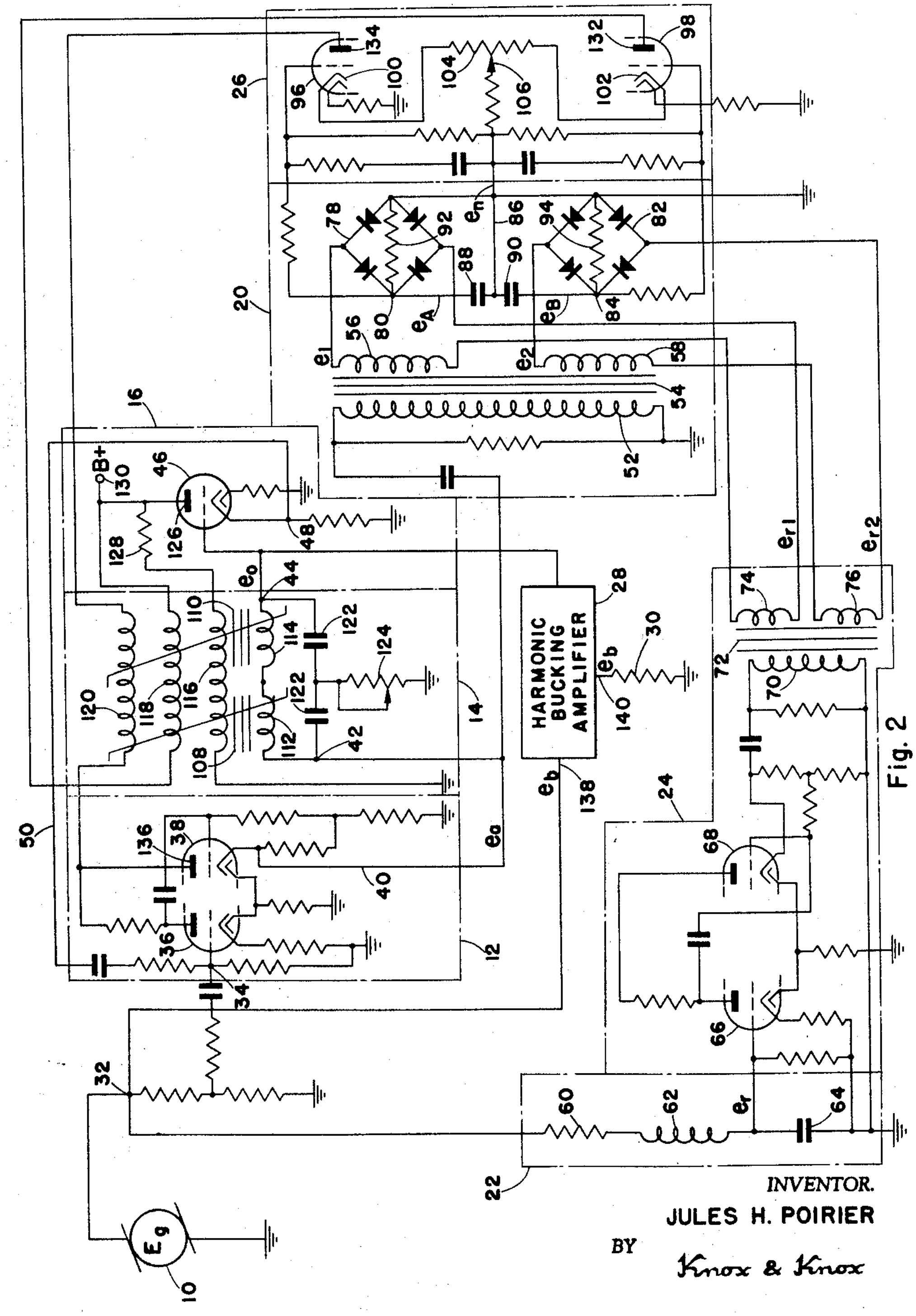
Figure 2 is a schematic wiring diagram of one complete operational form of the circuit.

The basis of the circuit is the automatically tuned, fundamental frequency rejection filter, a complete circuit of which is illustrated in Figure 2. One side of the generator 10 is grounded, the distorted output from other side, at 32, being attenuated and fed to the input 34 of amplifier 12, which is a substantially conventional band pass amplifier. The attenuated generator voltage is amplified by tube 36 and passed to the cathode follower 38, the band pass output voltage $e_a$ of which is delivered from the amplifier output 40 to the bridge T filter network 14 at input 42. The harmonic output voltage $e_o$ of filter network 14, at output 44, is delivered to the cathode follower tube 46 of isolation amplifier 16, the output 48 of said isolation amplifier being connected to the band pass amplifier input 34 by a negative feedback loop 50. The filter network 14 will be described later in detail.

The voltage $e_a$ from amplifier output 40 is also applied to the primary winding 52 of a phase comparator transformer 54, which has a pair of secondary windings 56 and 58 providing equal secondary voltages $e_1$ and $e_2$, respectively, in phase and 180 degrees out of phase with the generator output voltage $E_g$. The generator output 32 is also connected to the 90 degree phase shifter 22, which is a conventional RLC network including a resistor 60, inductor 62 and capacitor 64. The phase shifter output voltage $e_r$, which is lagging 90 degrees from the generator voltage $E_g$, is applied to amplifier 24, amplified by tube 66, passed through cathode follower 68 and fed to one end of the primary winding 70 of a reference transformer 72, the other end of said primary winding being connected back to the phase shifter 22 across the capacitor 64. The reference transformer 72 has a pair of secondary windings 74 and 76 which are connected at one end to the secondary windings 56 and 58, respectively, the other ends of windings 74 and 76 providing equal reference voltages $e_{r1}$ and $e_{r2}$, which are both lagging the generator voltage $E_g$. If resistor 60 is large enough, the phase shift will not have any appreciable drift despite generator frequency variation.

The secondary windings 56 and 74 are connected to a diode bridge rectifier 78 to add the voltages $e_1$ and $e_{r1}$ vectorially and provide a sum voltage $e_A$ at output 80. Similarly, the secondary windings 58 and 76 are connected to a diode bridge rectifier 82 to add the voltages $e_2$ and $e_{r2}$ and provide a sum voltage $e_B$ at output 84. The outputs 80 and 84 are connected to a common center tap 86 of the servo amplifier 26 through capacitors 88 and 90, which filter the full wave rectified sine wave voltages appearing in resistors 92 and 94 across the diode bridge rectifiers 78 and 82, respectively. The center tap 86 is grounded, which enables the phase comparator to be used with a simple grounded differential D.C. amplifier.

The differential servo amplifier 26 includes a pair of tubes 96 and 98, which may be halves of a dual tube, the voltages $e_A$ and $e_B$ from outputs 80 and 84 being amplified by said tubes. The cathodes 100 and 102 of tubes 96 and 98, respectively, are interconnected through a variable balancing resistor 104, having an adjustable tap 106 connected to the center tap 86, so that the servo amplifier can be balanced.

The filter network 14 includes a pair of toroidal cores 108 and 110 having identical load windings 112 and 114, respectively wound thereon and interconnected in series. In construction, the cores, with their load windings, connected in series, are stacked and a bias winding 116 and two control windings 118 and 120 are wound around the stacked cores, so that all windings are in the same direction. The inductance of the load windings 112 and 114 is made equal to half the total inductance necessary to reject the fundamental frequency. A conventional bridge T network, comprising a pair of capacitors 122 center tapped to ground through a variable resistor 124, is connected across the opposite ends of interconnected load windings 112 and 114. The bias winding 116 is connected between ground and the plate 126 of tube 46, and through a resistor 128 to a bias voltage input 130. The control winding 118 is connected directly between the plate 126 and the plate 132 of tube 98, while the control winding 120 is connected between the plate 134 of tube 96 and the plate 136 of tube 38. Control windings 118 and 120 have an equal number of turns and are connected in the tube plate circuits so that the control core fluxes in cores 108 and 110 cancel when voltage $e_1$ is in phase with generator voltage $E_g$, said control windings being connected so that the current flow in one is in the same direction as the current flow in bias winding 116, while the current flow in the other control winding is in the opposite direction. With the distorted voltage $e_a$ applied between ground and the input 42, the load windings 112 and 114 are impressed with equal voltages and their induced voltages across the bias winding 116 and control windings 118 and 120 are cancelled, so preventing transformer action and avoiding inductance variation due to control impedance changes.

In operation, the voltage in the bias winding 116 is of sufficient magnitude to reduce the inductance of both load windings 112 and 114 to half the required inductance at the center frequency desired. As long as voltage $e_1$ is in phase with the generator voltage $E_g$, the sum voltages $e_A$ and $e_B$ are equal, the voltage in control windings 118 and 120 also being equal and the resultant control fluxes equal and opposite in phase, with zero effect on total inductance. However, if the generator frequency increases, the voltage $e_1$ will lag, causing the sum voltage $e_A$ to increase and the sum voltage $e_B$ to decrease, creating a D.C. differential voltage between outputs 80 and 84. The differential voltage is amplified by the servo amplifier tubes 96 and 98 and applied to the control windings 120 and 118, causing an increase in voltage in one winding and a decrease in voltage in the other. The control windings are connected so that an increase in generator frequency causes a resultant differential control flux which adds to the bias flux, reducing the total inductance and tuning the filter network 14 to reject a higher frequency. In a similar manner, if the generator frequency decreases, voltage $e_1$ leads the generator voltage in phase and the resultant differential control flux subtracts from the bias flux, increasing the total inductance and tuning the filter network 14 to reject a lower frequency. Thus the filter network is automatically tuned to the proper rejection frequency at all times, the filter network rejecting the fundamental generator frequency, regardless of frequency variations, yet passing all harmonic and subharmonic generator voltages.

The undesirable harmonic voltages $e_0$ appearing at filter network output 44 are fed to the harmonic bucking amplifier 28, which is a conventional, low distortion bucking amplifier having dual outputs 138 and 140. The harmonic output bucking voltages at outputs 138 and 140 are equal in amplitude and opposite in phase, output 138 being connected to the generator output 32 and output 140 being connected to the load 30, with the result that the harmonics cancel each other and the voltage across the load is virtually undistorted.

The circuit has many advantages over static oscillator, power amplifier inverter type harmonic filters and null seeking frequency discriminator devices. Normally, the inverter type circuit is not synchronized with the generator frequency and causes undesirable phase shift. The null seeking type servo used to tune the filter becomes effectively an open loop circuit when the frequency discriminator output is zero and the filter tunes to the core hysteresis flux.

The circuit illustrated automatically tunes the bridge T rejection filter and provides a low distortion sine wave output voltage, synchronized with the generator voltage, regardless of load conditions. Power requirements are low compared to other circuits, since only sufficient power to buck out harmonics is required, the size, weight and cost of the apparatus being correspondingly reduced.

Certain portions of the circuit as illustrated, such as the phase shifter 22, amplifiers 12, 16, 24 and 26, are substantially conventional and other similar units may be substituted. While vacuum tubes are indicated, it will be obvious that the circuit may be transistorized to achieve further weight and size reduction, making the apparatus especially suitable for use in aircraft power supply systems.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. An A.C. harmonic distortion eliminator, comprising: a primary, distorted A.C. voltage input; a tunable, bridge T filter network having an input connected to said primary input; a phase shifter connected to said primary input and providing a reference voltage 90 degrees out of phase with the distorted A.C. voltage; a phase comparator coupled to said primary input and said phase shifter to compare the distorted A.C. voltage and said reference voltage and providing a differential voltage output proportional to the phase difference of the compared voltages; said filter network including a flux biased inductor tuned to reject the fundamental frequency of the distorted A.C. voltage; said inductor being connected to said differential voltage output, whereby changes in frequency of the distorted A.C. voltage cause changes in inductance of said inductor and tune said filter network to reject the changing fundamental frequency and passing the distorted portion of the A.C. voltage as a distorted voltage output; and means connecting said distorted voltage output to said primary input with the distorted voltage opposite in phase to the A.C. input voltage, whereby the distorted voltages cancel each other.

2. An A.C. harmonic distortion eliminator, comprising: a primary, distorted A.C. voltage input; a tunable, bridge T filter network having an input connected to said primary input; a phase shifter connected to said primary input and providing a reference voltage 90 degrees out of phase with the distorted A.C. voltage; a phase comparator coupled to said primary input and said phase shifter to compare the distorted A.C. voltage and said reference voltage and providing a differential voltage output proportional to the phase difference of the compared voltages; said filter network including an inductor having a pair of cores, each having a load winding thereon; said load windings being identical and connected in series; a bias winding superimposed on said load windings; and a pair of control windings superimposed on said bias winding; said bias winding being connected to a source of bias voltage to maintain a bias flux in said cores sufficient to cause rejection of the fundamental frequency of the distorted A.C. voltage; said load windings being connected to said differential voltage output, whereby changes in frequency of the distorted A.C. voltage cause changes in inductance of said inductor and tune said filter network to reject the changing fundamental frequency and passing the distorted portion of the A.C. voltage as a distorted voltage output; and means connecting said distorted voltage output to said primary input with the distorted voltage opposite in phase to the A.C. input voltage, whereby the distorted voltages cancel each other.

3. An A.C. harmonic distortion eliminator according to claim 1, wherein said means is a harmonic bucking amplifier having a pair of outputs providing distorted output bucking voltages substantially equal in amplitude and opposite in phase; one of said last mentioned outputs being connected to said primary input with the distorted voltage opposite in phase to the distorted A.C. input voltage; and a load connected to the other of said last mentioned outputs, whereby the distorted voltages cancel each other.

4. An A.C. harmonic distortion eliminator, comprising: a primary, distorted A.C. voltage input; a tunable, bridge T filter network having an input connected to said primary input; a phase shifter connected to said primary input and providing a reference voltage 90 degrees out of phase with the distorted A.C. voltage; a reference transformer connected to said phase shifter and having a pair of reference outputs providing reference voltages opposite in phase; a phase comparator connected to said primary input and including a transformer having a pair of secondary outputs providing voltages opposite in phase; said phase comparator comparing the voltages from said reference outputs with those from said secondary outputs and providing a differential voltage output proportional to the phase difference of the compared voltages; said filter network including an inductor having a pair of cores, each having a load winding thereon; said load windings being identical and connected in series; a bias winding superimposed on said load windings; and a pair of control windings superimposed on said bias winding; said bias winding being connected to a source of bias voltage to maintain a bias flux in said cores sufficient to cause rejection of the fundamental frequency of the distorted A.C. voltage; said load windings being connected to said differential voltage output, whereby changes in frequency of the distorted A.C. voltage cause changes in inductance of said inductor and tune said filter network to reject the changing fundamental frequency and passing the distorted portion of the A.C. voltage as a distorted voltage output; and means connecting said distorted voltage output to said primary input with the distorted voltage opposite in phase to the A.C. input voltage, whereby the distorted voltages cancel each other.

5. An A.C. harmonic distortion eliminator, comprising: a primary, distorted A.C. voltage input; a tunable, bridge T filter network having an input connected to said primary input; a phase shifter connected to said primary input and providing a reference voltage 90 degrees out of phase with the distorted A.C. voltage; a reference transformer connected to said phase shifter and having a pair of reference outputs providing reference voltages opposite in phase; a phase comparator connected to said primary input and including a transformer having a pair of secondary outputs providing voltages opposite in phase; a pair of diode bridge rectifiers each connected between one of said secondary outputs and one of said reference outputs; said rectifiers having rectified outputs being capacitance coupled to a common ground, whereby changes in phase between the voltages at said secondary and reference outputs causes a D.C. differential voltage to appear between said rectified outputs; said filter network including an inductor having a pair of cores, each having a load winding thereon; said load windings being identical and connected in series; a bias winding superimposed on said load windings; and a pair of control windings superimposed on said bias winding; said bias winding being connected to a source of bias voltage to maintain a bias flux in said cores sufficient to cause rejection of the fundamental frequency of the distorted A.C. voltage; said load windings being connected to said rectified outputs, whereby changes in the differential voltage cause changes in inductance of said inductor and tune said filter network to reject the changing fundamental frequency while passing the distorted portion of the A.C. voltage as a distorted voltage input; and means connecting said distorted voltage output to said primary input with the distorted voltage opposite in phase to the A.C. input voltage, whereby the distorted voltages cancel each other.

6. An A.C. harmonic distortion eliminator according to claim 5, wherein said means is a harmonic bucking amplfier having a pair of outputs providing distorted output bucking voltages substantially equal in amplitude and opposite in phase; one of said last mentioned outputs being connected to said primary input with the distorted voltage opposite in phase to the distorted A.C. input voltage; and a load connected to the other of said last mentioned outputs, whereby the distorted voltages cancel each other.

No references cited.